(12) United States Patent
Robles et al.

(10) Patent No.: US 11,660,566 B2
(45) Date of Patent: May 30, 2023

(54) HYDROGEN PURIFICATION USING MOLECULAR DYNAMICS

(71) Applicant: H24US CORP, Camarillo, CA (US)

(72) Inventors: Glen Robles, Santa Maria, CA (US); Robert Nimocks, Santa Barbara, CA (US); Mike Rocke, Flower Mound, TX (US); Charity Cheiky, Thousand Oaks, CA (US)

(73) Assignee: H24US Corp., Camarillo, CA (US)

( * ) Notice: Subject to any disclaimer, the term of this patent is extended or adjusted under 35 U.S.C. 154(b) by 0 days.

(21) Appl. No.: 17/850,624

(22) Filed: Jun. 27, 2022

(65) Prior Publication Data
US 2022/0331733 A1 Oct. 20, 2022

Related U.S. Application Data

(63) Continuation-in-part of application No. 17/389,014, filed on Jul. 29, 2021, now Pat. No. 11,400,423.
(Continued)

(51) Int. Cl.
| | | |
|---|---|---|
| *B01D 53/22* | (2006.01) | |
| *B01D 69/12* | (2006.01) | |
| *B01D 69/02* | (2006.01) | |
| *B01D 69/14* | (2006.01) | |
| *B01D 71/36* | (2006.01) | |
| *C01B 3/50* | (2006.01) | |
| *B01D 71/02* | (2006.01) | |

(52) U.S. Cl.
CPC ......... *B01D 53/228* (2013.01); *B01D 53/226* (2013.01); *B01D 69/02* (2013.01); *B01D 69/1216* (2022.08); *B01D 69/1218* (2022.08); *B01D 69/148* (2013.01); *B01D 71/021* (2013.01); *B01D 71/36* (2013.01); *C01B 3/503* (2013.01); *B01D 2325/0231* (2022.08); *B01D 2325/0233* (2022.08); *C01B 2203/0405* (2013.01); *C01B 2203/048* (2013.01); *C01B 2203/0475* (2013.01)

(58) Field of Classification Search
None
See application file for complete search history.

(56) References Cited

U.S. PATENT DOCUMENTS

| | | | |
|---|---|---|---|
| 5,432,022 A | 7/1995 | Cheiky | |
| 5,997,829 A * | 12/1999 | Sekine | B01D 53/02 423/230 |

(Continued)

OTHER PUBLICATIONS

International Search Report and Written Opinion for Application No. PCT/US2021/044505, dated Nov. 12, 2021.
(Continued)

*Primary Examiner* — Jason M Greene
(74) *Attorney, Agent, or Firm* — Sheppard Mullin Richter & Hampton LLP

(57) ABSTRACT

A membrane is described for purifying or separating hydrogen from a multi-component gas stream such as syngas. This membrane uses a molecular pre-treatment, a transition metal, fluorine containing polymer, carbon fibers and carbon matrix sintered on a supportive screen. The membrane may be a bilayer membrane comprised of a layer containing high surface area carbon and another layer containing lower surface area carbon. Methods for purifying hydrogen are also described.

10 Claims, 6 Drawing Sheets

Related U.S. Application Data

(60) Provisional application No. 63/061,608, filed on Aug. 5, 2020.

(56) References Cited

U.S. PATENT DOCUMENTS

| | | |
|---|---|---|
| 6,214,093 B1 | 4/2001 | Nabata et al. |
| 9,358,506 B2 | 6/2016 | Cheiky |
| 2015/0059575 A1* | 3/2015 | Cheiky ............... B01D 71/021 96/4 |
| 2016/0251218 A1 | 9/2016 | Cheiky |
| 2017/0128876 A1 | 11/2017 | Shibuya et al. |
| 2018/0065094 A1 | 3/2018 | Chaen et al. |

OTHER PUBLICATIONS

Sterling C, Vulcan XC72, Vulcan XC72R, Akrochem Corporation, Aug. 5, 2019, pp. 1-2.

* cited by examiner

(12) United States Patent
US 11,660,566 B2

HYDROGEN PURIFICATION USING MOLECULAR DYNAMICS

CROSS-REFERENCE TO RELATED APPLICATIONS

The present application is a continuation-in-part of U.S. patent application Ser. No. 17/389,014, filed on Jul. 29, 2021, which claims priority to U.S. Provisional Patent Application No. 63/061,608, filed Aug. 5, 2020, the contents of which are incorporated in their entireties.

TECHNICAL FIELD

The disclosure broadly relates to hydrogen production, and more particularly, to a membrane capable of selectively filtering out hydrogen from natural, renewable or trace gas sources.

BACKGROUND

Hydrogen is an energy carrier and is becoming more viable as an energy source at the consumer level. The hydrogen industry is moving at an ever-increasing pace towards lower cost production and commercialization in a global environment. Successful hydrogen commercialization will require production from renewable energy sources and distribution that is competitive or lower cost than other energy resources.

Hydrogen use does not produce carbon emissions when used as an energy source in a fuel-cell application or as the fuel in an internal combustion engine or vehicle. Current commercial production of hydrogen is achieved with steam gasification of methane that releases copious amounts of carbon into the atmosphere, which is referred to as "gray hydrogen." A lower carbon footprint production of hydrogen uses Carbon Capture and Sequestration (CCS), which is referred to as "blue hydrogen." The zero-carbon footprint production is derived via electrolysis or splitting of water using renewable energy, which is referred to as "green hydrogen."

As costs of renewable energy decrease, significant quantities of hydrogen will be produced for the consumer in a projected price range of $1 to $2 per kg, making hydrogen competitive with gasoline or natural gas on an energy equivalent basis. Hydrogen is also complementary to fuel cell electric vehicles.

Hydrogen purification is currently commercially attained at scale by pressure swing adsorption and cryogenic distillation. Both of these techniques require significant energy expenditures and substantial capital expense. A more viable approach might entail the use of a membrane system which incorporates minimal capital expense, low carbon footprint, and operational flexibility while meeting the volume throughput of current and future commercial applications.

SUMMARY

As disclosed herein, the present disclosure solves the above-described disadvantages by providing a membrane system which incorporates minimal capital expense, low carbon footprint, and operational flexibility while meeting the volume throughput of current and future commercial applications. In particular, if hydrogen is transported in existing natural gas lines as is now being proposed globally, with a 5 to 20% hydrogen to natural gas ratio contained in the pipeline, a separating membrane to extract this hydrogen from the other gasses would slash both the carbon footprint and the user's hydrogen cost. This hydrogen separating membrane would accelerate achieving a zero-carbon energy society.

Membrane gas separation could have a significant impact on commercial hydrogen production, in particular as it relates to using a passive, selectively engineered permeable, polymer membrane that is pre-treated, to produce a highly purified hydrogen derived from renewable sources. Currently commercially available membranes are based on precious metals. Specifically, membranes are typically coated with palladium 20 to 50 microns in thickness. These membranes are expensive due to the high cost of the underlying palladium or platinum group metals (PGM's) as well as the high cost of the membrane fabrication. Additionally, issues such as hydrogen embrittlement of these precious metals limit the life of these membranes.

Hydrogen purification membranes comprised of inexpensive materials produced by simple manufacturing process are needed. One alternative is polymeric membranes comprised of a support layer, and a selective permeable polymer layer residing on the support layer. Typically, these polymer membranes are very thin, on the order of 1 to 5 microns, and consist of such polymers as ethyl cellulose and polydimethylsiloxane. These membranes are not currently a commercial product and are presently limited by the volume of material that can be processed per unit time.

Embodiments of the present application disclose a multistage hybrid membrane comprising carbon, fluorine containing polymer and is without (PGM) metal. This membrane effectively filters out hydrogen when pre-treated by gas molecules from a gas stream containing a variety of other gases, in particular gases that include methane, and carbon dioxide from the gas origin.

Prior work in this area includes U.S. Pat. No. 5,432,022, describing a coated cathode for a rechargeable metal battery in which a metal-air battery is protected against the effects of $CO_2$ by incorporating a $CO_2$ gettering agent which is embedded in a hydrophobic binder material to form a gas-permeable layer deposited on the current collector. This patent fails to mention utility with regard to hydrogen selectivity and use as a hydrogen purification membrane. U.S. Pat. No. 9,358,506 to Cheiky refers to a hydrogen separation system and membrane for extracting hydrogen from gasifier streams at near atmospheric pressure and ambient temperature conditions. The system comprises a bypass valve disposed between the gasifier and the engine genset for routing the gas stream through a hydrogen concentrator; and the hydrogen concentrator for concentrating the gas stream, the hydrogen concentrator comprising a filter for filtering the gas stream, a pump for pumping the gas stream through the hydrogen concentrator, a membrane formed from a bulk carbon which is compressed and held in form by sintered PTFE, and a hydrogen compressor; wherein the membrane comprises a permselective membrane for permeating hydrogen from the gas stream.

Embodiments of the present application differ from this prior work in the construction of the membrane, in the pre-treatment membrane process, and uses a transition metal compound in one or more layers, one layer comprising a high surface area carbon, and other layers comprising a lower surface area carbon. A full differentiation will be apparent from the detailed description of this invention.

Some embodiments of the present disclosure are directed toward a membrane or membrane system capable of concentrating and purifying hydrogen from a gas stream comprised of a variety of manmade or natural gases, such as nitrogen, carbon dioxide, oxygen, carbon monoxide and methane. Certain embodiments utilize gas streams derived from steam gasification of natural gas, while other embodiments utilize a gas stream derived from using renewable energy for electrolysis of water, gas streams from abandoned and uncapped hydrocarbon wells, biomethane from mammalian and bacterial emissions as broken down in a biodigester. The membrane system described herein is comprised of at least one membrane exhibiting special selectivity towards hydrogen with a molecular conditioned gas pre-treatment for selective permeability relative to other components in the gas stream.

BRIEF DESCRIPTION OF THE DRAWINGS

Certain embodiments of the present disclosure will hereinafter be described in detail, by way of example only, with reference to the accompanying drawings, in which.

The figures are not intended to be exhaustive or to limit the disclosure to the precise form disclosed. It should be understood that the disclosure can be practiced with modification and alteration, and that the disclosure be limited only by the claims and the equivalents thereof.

DETAILED DESCRIPTION OF THE EMBODIMENTS

Figure 1:
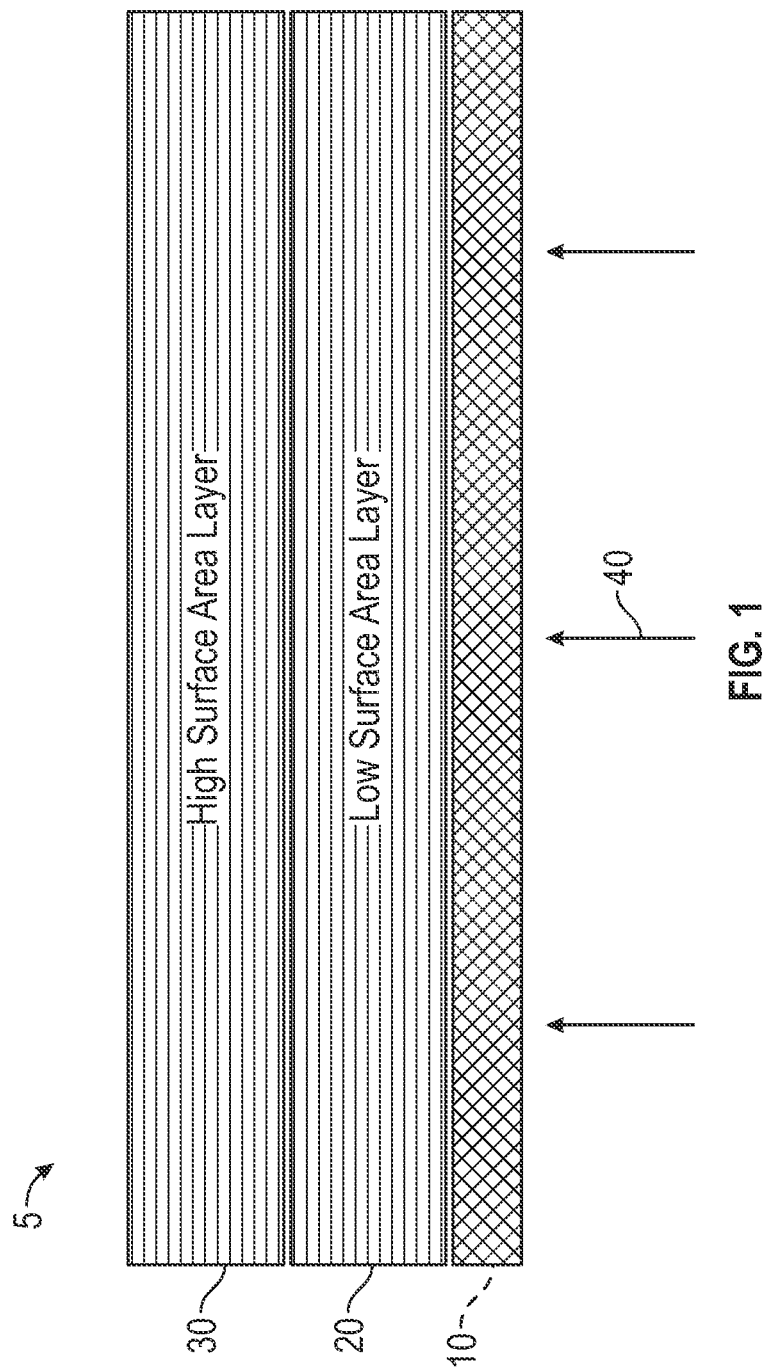
FIG. 1 is a cross-sectional view illustrating the construction of a membrane systems, in accordance with embodiments of the present application.

Referring to FIG. 1, membrane system 5 is comprised of at least one active hydrogen transporting layer. Although the depicted embodiment contains two layers, any number of layers is possible without departing from the scope of the present application. Layer 30 is a comprised of materials containing a mixture of carbon fibers, transition nonmetal compounds, a fluorine containing polymer, and activated carbon. Layer 20 is comprised of a mixture of carbon fibers, transition metal compounds, a fluorine containing polymer, and low porosity carbon. Both substrates are supported by a metal or Kevlar screen or other structural support which permits the free flow of gasses 10.

Screen 10 can be a porous filter made from a variety of different materials whose primary purpose is to provide mechanical strength to the membrane while allowing significant flow of incoming gas. This layer may be a glass fiber filter, Kevlar, metal screen filter, ceramic filter, polyester filter, or polypropylene filter. It may also comprise mechanically strong microporous filters such as built from nylon, polysulfone, Kevlar, polyvinylidene fluoride, and polytetrafluoroethylene (PTFE). In some embodiments, the screen comprises a ceramic filter, which can have pore sizes as small as 0.1 microns.

Layer 20 can comprise a more permeable and open structure than layer 30 due to inclusion of lower density carbon materials. The carbon used in this construction may be a number of carbon blacks such as thermally decomposed carbon from petroleum sources (e.g., pet coke, acetylene or natural gas). It may also comprise carbon materials such as carbon nanotube, carbon nanofiber and graphene. Typical dimensional spacing of this carbon material are less than 200 nm, and spaces between carbon particles smaller than 300 $m^2/g$ are preferred embodiments. This layer has a more open structure than layer 30 and allows for a prefiltering and faster throughput of material.

In some embodiments, layer 30 is substantially similar in material composition but differs in construction of layer 20 in the nature of the carbon and the transition metal compound used. Layer 30 uses activated carbon with porosities exceeding 300 $m^2/g$, and preferably exceeding 500 $m^2/g$, and more preferably exceeding 700 $m^2/g$. This activated carbon may be derived from a variety of different sources, including, but not limited to, coconut shells, almond shells, wood, biomass trimmings, and coal. These activated carbons typically have nanopores less than 3 nm in diameter. The specific surface area herein is determined by measuring the nitrogen or carbon dioxide adsorption amount and using a Brunauer Emmet and Teller (BET) method. Micropores, i.e. pores in the micron range, may be built into this membrane through the use of pore forming materials such as ammonium carbonate.

Proper porosity in combination with molecular pre-treating of the membrane are believed to be responsible for the observed selectivity in the membranes. A transition metals compound can be added to aid the gettering power of the membrane towards methane while slowing down the $CO_2$ flow through. The transition metal compounds in these membranes may comprise a compound of nickel, cobalt, titanium, tungsten, vanadium, chromium, manganese, iron, copper, zinc, zirconium, molybdenum, silver, or niobium, as a salt of such as hydroxide, carbonate, chloride, nitrate, nitrite, or sulfate, or as an organometallic complex catalyst. Examples of these organometallic compounds of nickel, cobalt, titanium, or iron may include acetylacetonate compounds, salts of carboxylic acid, and cyclopentadienyl compounds of each of the metals.

The carbon powders used in the membranes of the current disclosure are preferably embedded in a matrix of a fluorine-containing polymer such as polytetrafluoroethylene (PTFE), poly(trifluoro ethylene), poly trifluoro chloroethylene, polyvinyl fluoride, or any compound bearing the formula $C_xH_yF_z$ or $C_xH_yF_zO_a$, or polymers thereof, where x, y, z and a are positive integers or 0. Other hydrocarbons that may be utilized include polypropylene and polyethylene.

The following example illustrates the construction of this membrane system.

Example 1

HIGH SURFACE AREA LAYER: 0.25 g of carbon fibers of length 3 mm are mixed with 200 mL of methanol to form a slurry and 3 g of 1000 $m^2/g$ activated carbon are added to mixture and blended in a mechanical stirrer. 7 g of PTFE suspension along with 1 g of cobalt hydroxide are subsequently added to the mixture. The entire well mixed contents are added to a filter bed containing the support screen. The bed assembly allows the removal of the methanol upon vacuum application to leave a solid cake.

LOWER SURFACE AREA LAYER: 0.25 g of carbon fibers of length 3 mm are mixed with 200 ml of methanol to form a slurry and 3 g of 40 $m^2/g$ carbon black are added to mixture and blended in a mechanical stirrer. 3.5 g of PTFE suspension along with 1 g of nickel hydroxide are subsequently added to the mixture.

The entire well mixed contents of the lower surface area layer are added to the high surface area cake material, and the methanol is subsequently extracted with vacuum to leave the bilayer cake. The solid cake is slowly heated below the boiling point of methanol to remove most of any residual solvent. The dry cake is subsequently placed between two metal plates and the assembly is sintered while at high pressure to a temperature of 350° C. where the polymer is rendered completely thermoset.

Figure 2:
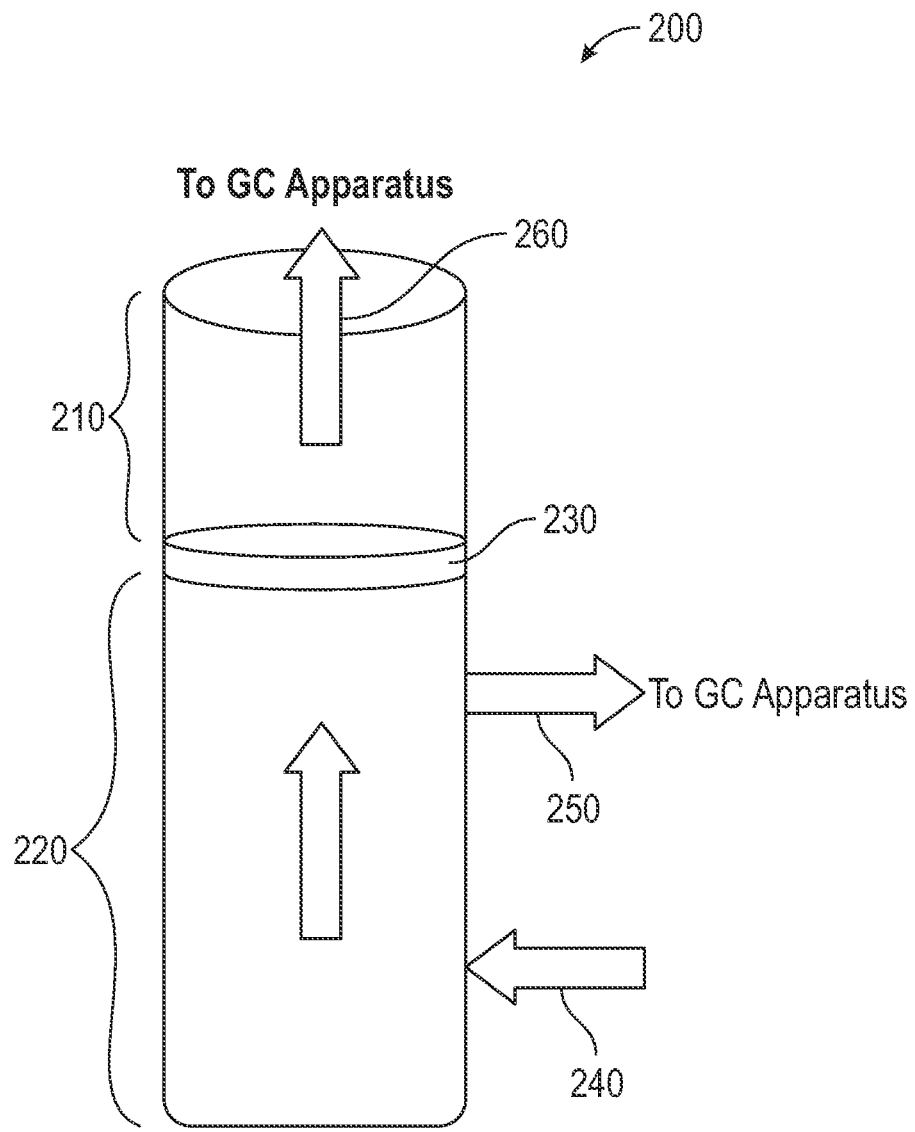
FIG. 2 is a diagram illustrating an experimental setup to characterize the selectivity of various membranes, in accordance with embodiments of the present application.

FIG. 2 is a diagram illustrating an experimental setup to characterize the selectivity of various membranes, in accordance with embodiments of the present application. In particular, several membranes built according to this protocol were tested for hydrogen selectivity in an assembly 200 as shown in FIG. 2. This assembly 200 is comprised of a metal assembly divided into 2 fixtures, an upper fixture 210 and lower fixture 220, separated by the test membrane 230. The membrane 230 is clamped down between the upper and lower fixtures in a leak proof manner in order to permit the inlet gas stream 240 to pass only through the membrane. Both upper fixture 210 and lower fixture 220 contain sampling ports 250, 260 to analyze the gas composition in each fixture. Analysis is performed using gas chromatography (GC) using a thermal conductivity detector. The inlet gas was comprised of a mixture of methane, hydrogen and carbon dioxide. In a typical experiment run, the lower fixture 220 is pressurized to 1 to 5 psi with the input gas stream while the upper fixture 210 is evacuated to remove all air. Hydrogen, due to its size and speed, is used to clean and condition the membrane 230. The $CO_2$ flow is admitted, and after a suitable time interval, for example from 30 seconds to 20 minutes, the gas compositions in the upper and lower fixtures is analyzed.

Figure 3:
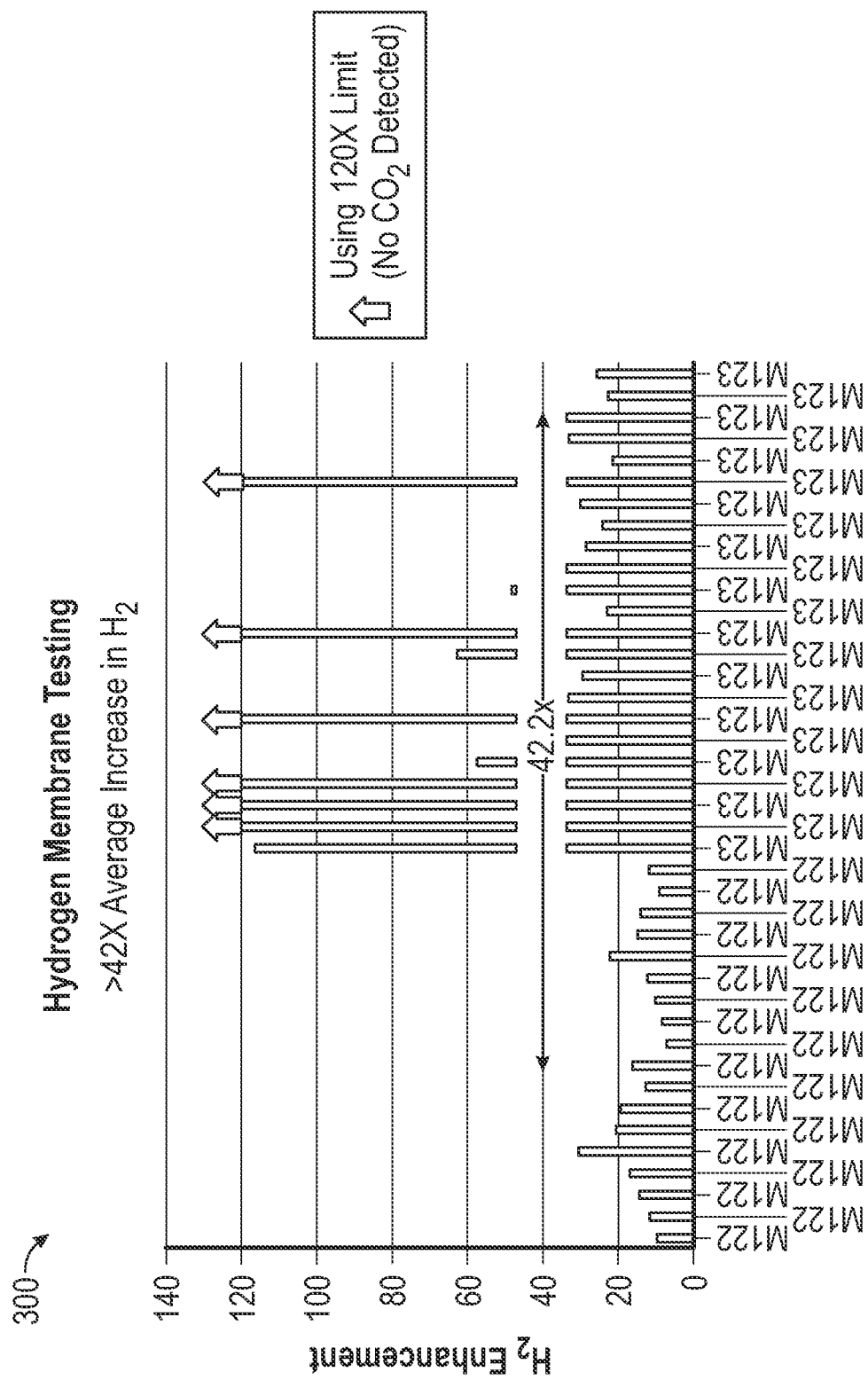
FIG. 3 is a table illustrating the results of permeability runs for different membranes built in accordance with the methods disclosed herein.

FIG. 3 is a table illustrating the results of permeability runs for different membranes built according to the methods of the present application. Shown are the ratios of hydrogen to carbon dioxide in the upper versus lower fixtures various times. The membranes observed showed a large average enhancement ratio greater than 40×, after 65 tests. Permeability was estimated as 388 $cm^3/cm^2$-min.

Figure 4:
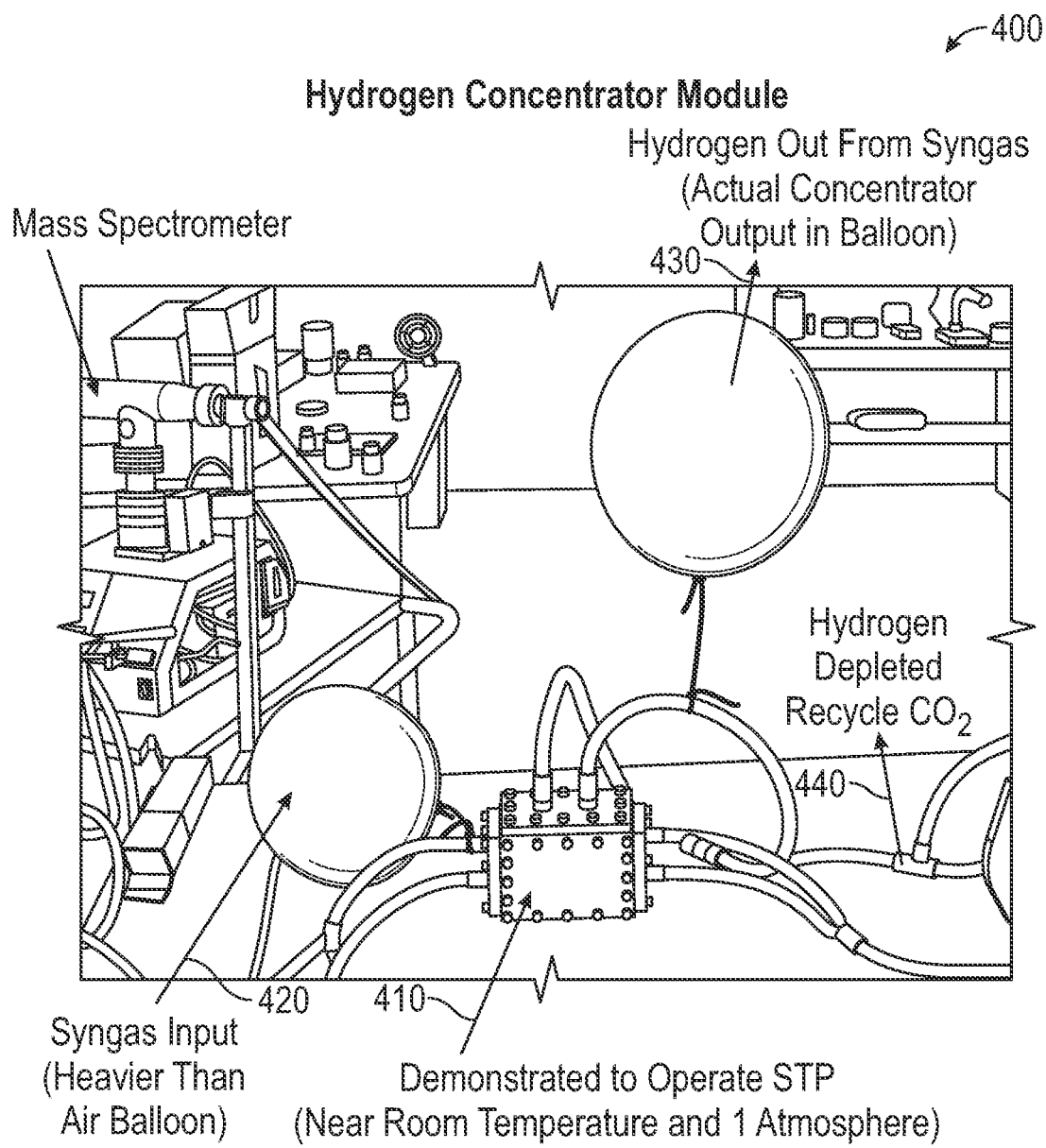
FIG. 4 a hydrogen concentrator that incorporates membranes built according to the methods disclosed herein.

FIG. 4 illustrates a hydrogen concentrator system 400 that incorporates membranes built according to the method of the present application. Gases captured from hydrogen production are routed to one end of a hydrogen concentrator 410 containing multiple membranes at low pressure. As depicted, the input syngas in balloon 420 is heavier than air. After entering the concentrator 410, the output is sent to a pump for compression prior to filling the airborne balloon 440. This figure illustrates the purification of the membranes of the present disclosure.

Figure 5:
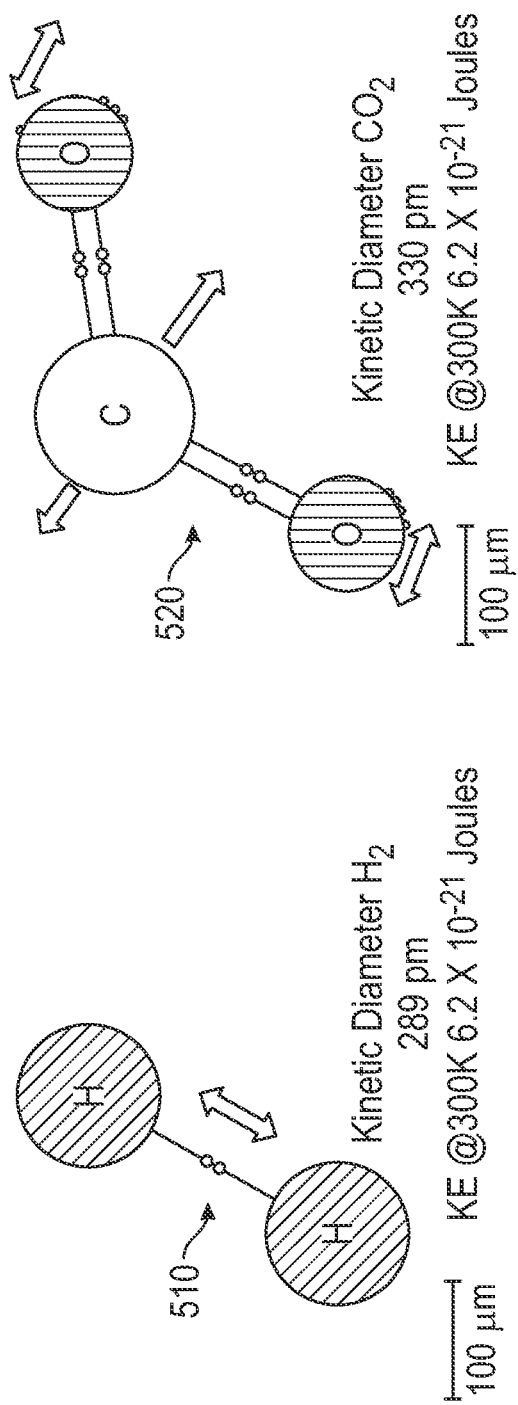
FIGS. 5 and 6 are diagrams illustrating the differences in hydrogen and $CO_2$ kinetic diameters, in accordance with embodiments of the present application.
Figure 6:
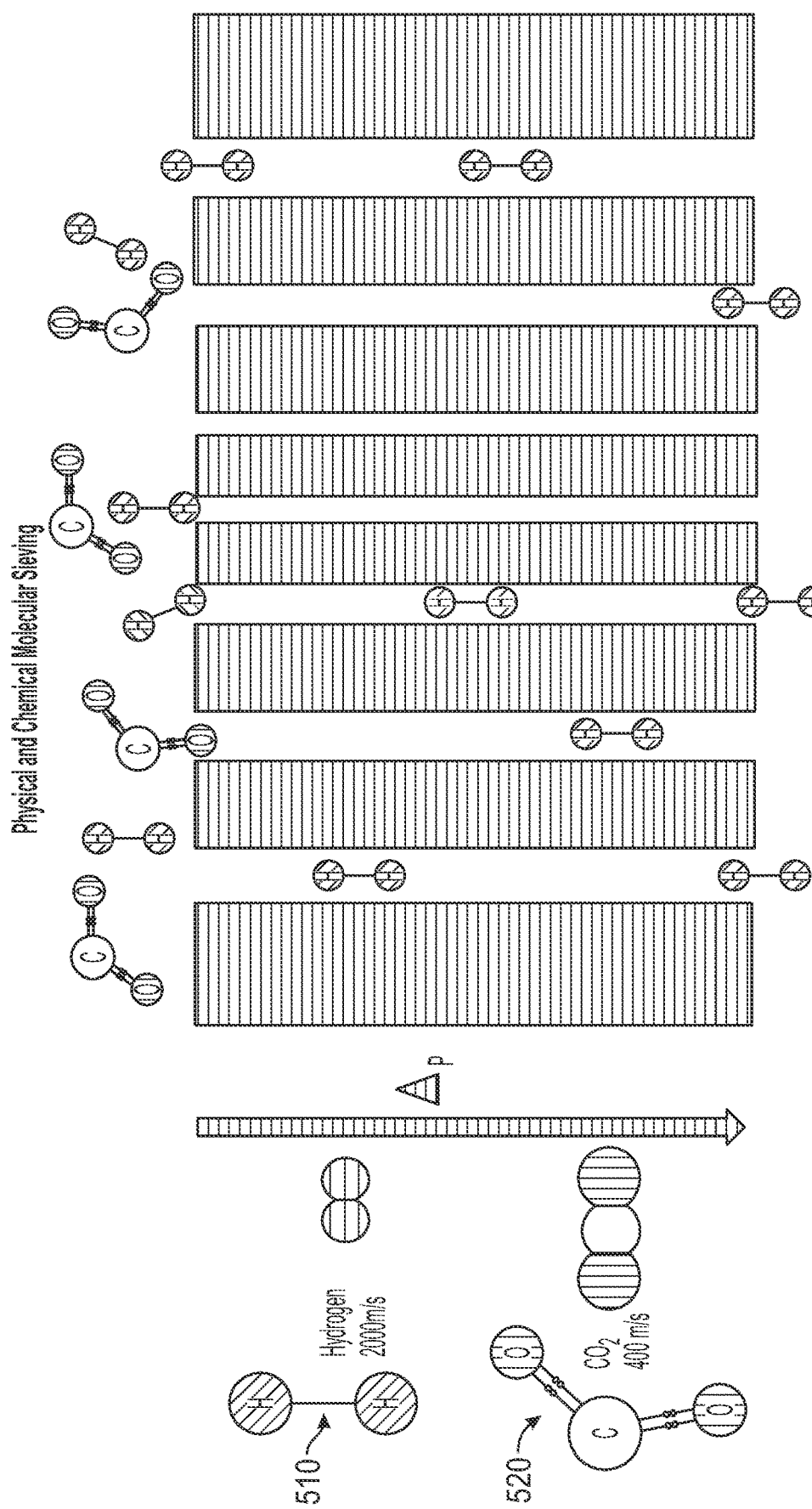

Referring to FIGS. 5 and 6, there are differences in hydrogen and $CO_2$ kinetic diameters (i.e., molecules are always flexing and rotating as they move). In the illustrated example, $CO_2$ is the "test molecule" as it is only 41 picometers ($10^{-12}$ m) larger that hydrogen. The other $CH_4$ and CO molecules are much larger, such that good results with $CO_2$ will lead to even better results for separating the larger molecules (i.e., $CH_4$ and CO).

Hydrogen moves @ ~2000 m/s (over 1 mile/sec.), whereas $CO_2$ is much slower @ ~400 m/s. However, both have the same kinetic energy due to their mass difference (light and fast for hydrogen versus heavy and slow for $CO_2$). Keeping the hydrogen moving and pulsing in the other gases allows the hydrogen to kinetically displace or "knock" the bigger molecules away from entering and clogging the small membrane openings at the membrane composition and porous opening size distributions of the various membranes described herein.

Moreover, a larger pulse of $CO_2$ unexpectedly allows additional hydrogen through due to the fact that $CO_2$ selectively blocks the slightly larger openings and pathways, as the smaller openings allow only hydrogen to pass. This selective blocking or molecular sieving represents an exciting inverse effect due to the membrane composition. It is then possible to shut down or cut back the $CO_2$ so that the molecular sieving is restored in minutes.

While the application has been explained in relation to its preferred embodiments, it is to be understood that various modifications thereof will become apparent to those skilled in the art upon reading the specification. Therefore, it is to be understood that the embodiments disclosed herein are intended to cover such modifications as fall within the scope of the appended claims.

In the following paragraphs, embodiments of the present disclosure will be described in detail by way of example with reference to the attached drawings. Throughout this description, the preferred embodiment and examples shown should be considered as exemplars, rather than as limitations on the present disclosure. As used herein, the "present disclosure" refers to any one of the embodiments of the disclosure described herein, and any equivalents. Furthermore, reference to various feature(s) of the "present disclosure" throughout this document does not mean that all claimed embodiments or methods must include the referenced feature(s).

One skilled in the art will appreciate that the present disclosure can be practiced by other than the various embodiments and preferred embodiments, which are presented in this description for purposes of illustration and not of limitation, and the present disclosure is limited only by the claims that follow. It is noted that equivalents for the particular embodiments discussed in this description may practice the disclosure as well.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that may be included in the disclosure. The disclosure is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present disclosure. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A method for hydrogen purification, comprising:
providing a hydrogen comprising a multi-stage hybrid membrane, each membrane comprising a screen, a first layer formed on the screen and a second layer formed on the first layer;
pumping a gas stream through the hydrogen concentrator, the gas stream comprising syngas including hydrogen and at least one additional gas; and
separating hydrogen from the mixture containing hydrogen and the at least one additional gas;
wherein pumping the gas stream comprises keeping the hydrogen moving within the hydrogen concentrator and pulsing in the at least one additional gas.

2. The method of claim 1, further comprising forming the first layer from a mixture of carbon fibers, transition metal compounds, a fluorine containing polymer, and an additional carbon material.

3. The method of claim 2, further comprising forming the second layer from a mixture of carbon fibers, transition metal compounds, a fluorine containing polymer, and activated carbon.

4. The method of claim 1, further comprising forming the first layer to be a more porous structure than the second layer to provide prefiltering and faster throughput of material.

5. The method of claim 1, further comprising forming the first layer from at least one lower density carbon material such that it comprises a more permeable and open structure than the second layer.

6. The method of claim 5, wherein the at least one lower density carbon material precursor is selected from the group consisting of: carbon nanotube, carbon nanofiber, carbon black derived from pet coke, acetylene or natural gas, and graphene.

7. The method of claim 3, further comprising deriving the activated carbon from sources selected from the group consisting of: coconut shells, almond shells, wood, biomass trimmings, and coal.

8. The method of claim 1, further comprising pre-treating the membrane with gas molecules from a gas stream containing methane and carbon dioxide.

9. The method of claim 1, wherein the at least one additional gas comprises carbon dioxide.

10. The method of claim 1, wherein the at least one additional gas comprises carbon dioxide and methane.

* * * * *